March 2, 1937.  G. RICHTER  2,072,343

OIL BURNER

Filed June 14, 1935

Inventor
George Richter
By his Attorney
Walter H. Humphrey

Patented Mar. 2, 1937

2,072,343

UNITED STATES PATENT OFFICE 2,072,343

OIL BURNER

George Richter, Stapleton, N. Y.

Application June 14, 1935, Serial No. 26,537

4 Claims. (Cl. 137—78)

The invention relates generally to oil burners and more particularly to the construction and arrangement of the valved oil supply line thereof leading from the oil reservoir to the furnace or range burner.

For the purposes of showing a practical application of the invention, it is specially designed and adapted, as herein embodied, for use in the valved oil supply line of an ordinary kitchen range burner, but, it will be understood, that it is not limited in its use and may be advantageously applied to other well known types of oil burners now in common use.

The increasing use of oil burners has given prominence to the difficulty experienced in keeping the system free of deposited carbon and other foreign matter, the accumulation of which not only reduces the efficiency of the burner, but, unless checked, will obstruct the supply of oil to such an extent as to render the burner practically inoperative.

The remedy ordinarily applied is to manually remove the deposited carbon and other foreign matter, wherever it can be reached and while the burner proper usually presents accessible surfaces for this purpose, difficulty is met with in clearing the oil supply line on both sides of the control valve, as no provision is made for entering a cleaning wire or tool and it is therefore necessary for this purpose to disconnect the joints of the supply line to and from the valve.

The supply line is ordinarily formed of copper or aluminum tubing and, in making an oil tight joint with the valve, the end of the tubing becomes somewhat irregularly shaped and expanded under the pressure applied in screwing up the connection nut and if the joint is thereafter disconnected, it is practically impossible to reconnect and make it tight, so the usual practice is to cut off the irregularly shaped end of the tubing and make a new joint.

In the ordinary installation, there is very little surplus in the lengths of tubing employed and by having an inch or so cut off the ends on each cleaning, the available surplus is soon used up and new lengths of tubing must then be supplied, fitted, etc.

Another disadvantage to the householder is that where the joints of the supply line have to be broken to clean the line, the services of a skilled workman are required to remake the joints, as they must be leak-proof, and such work requires ability and experience. This, added to the expense of new lengths of supply line tubing, from time to time, makes an objectionably high item of maintenance cost.

With these objectionable points in mind, I have produced a construction in which the supply line connections are arranged in such relation to the control valve as to provide a clear and unobstructed passage through the line sections for a cleaning wire or other tool, it being only necessary to remove two terminal screw caps closing the adjoining open ends of the line sections at the valve, to gain access and this, any householder or layman can do and proceed with the cleaning or clearing of the lines without the aid of a skilled workman, as the line joints are not disturbed and the operation can be carried out whenever required in a few minutes and at no expense.

A construction suitable for carrying the invention into effect is shown in the accompanying drawing but, as previously pointed out, I do not wish to be understood as intending to limit myself to the same, as various changes may be made in the form and details, without departing from the spirit and scope of the invention as outlined in the appended claims.

In the drawing—

Figure 1:
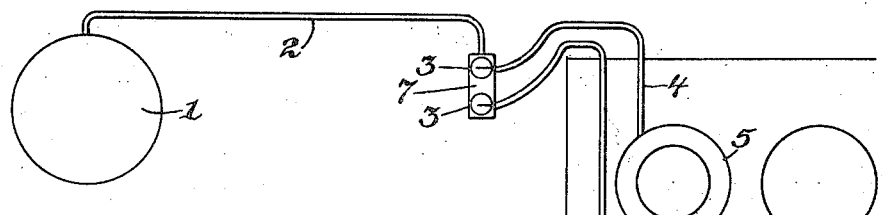
Fig. 1 is a diagrammatic plan view, showing the usual installation of an oil burner as applied to a kitchen range.

Referring now to the drawing, 1 indicates an oil reservoir; 2, an oil supply line from the reservoir to valves 3, 3, which control the flow of oil through the lines 4, 4 to the burners 5, 5. As arranged, the flow of oil to each burner is regulated by a separate valve to enable either or both burners to be used whenever desired.

The installation shown is designed for use in an ordinary kitchen range, indicated at 6, in the fire box of which the burners are mounted in the usual manner. The pipe lines 4, 4 from the valves, are led in to the burners through openings in the wall of the range, as shown. A scale plate 7, with the usual markings, is employed to indicate the closed position and also the extent of opening of the valves.

Figure 2:
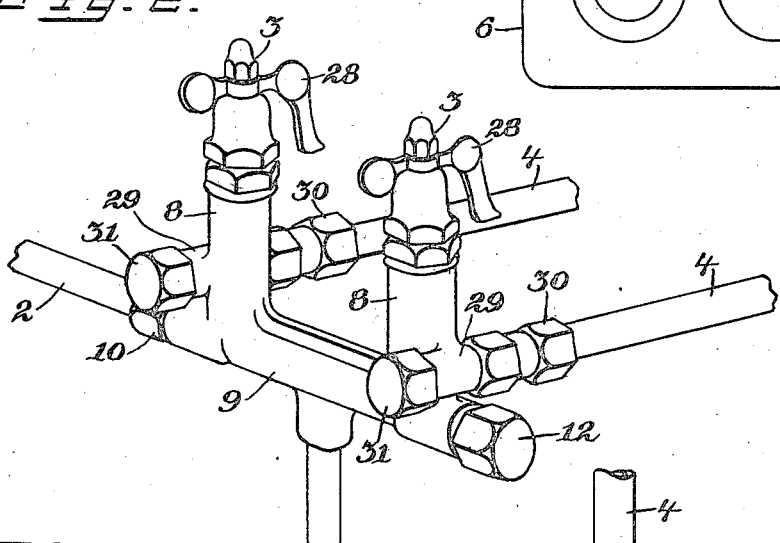
Fig. 2 is a perspective view of my improved construction and arrangement of the valved connections between the oil supply line sections.
Figures 3, 4:
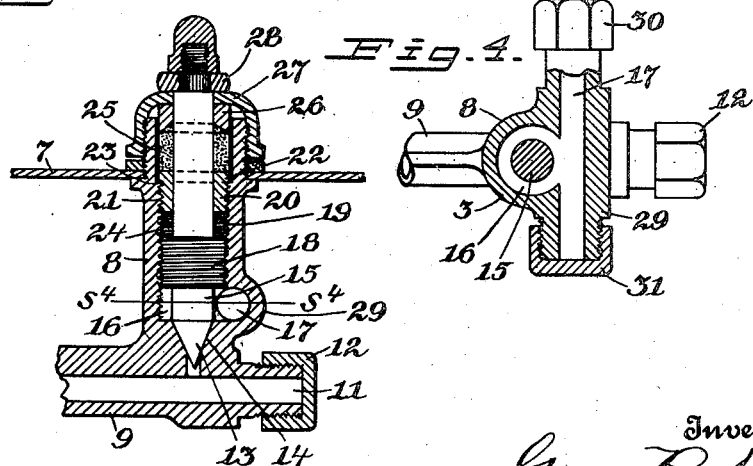
Fig. 3 is a detail vertical central section through one of the valves.
Fig. 4 is a horizontal section on the line $s^4$—$s^4$ of Fig. 3.

With reference to Figs. 2, 3 and 4, which show the details of the valves and the supply line connections thereto, it will be seen that the valve casings 8, 8 are carried by a short length pipe 9, cast in part with the casings and detachably connected at 10 to form a continuation of the oil supply line 2 from the reservoir to the valves. At the end opposite the connection with the reservoir line, the pipe 9 is continued beyond the second valve casing and terminates in an open end 11, which is closed by a screw cap 12, the removal of which opens the line back to the reservoir for the free entrance of a cleaning wire or brush, it not being necessary to break or otherwise disturb the connection 10.

The valve being identical, a description of only one of them will be given. As shown, the valves are of the needle type, the coned end 13, being fitted to a cone-shaped seat or opening 14, which opening represents the controlled passage through which the flow of oil from the reservoir to the burner is regulated.

That portion 15 of the valve stem above the cone end of the valve, is of such reduced diameter as to leave an annular space 16 around the same at the bottom of the valve casing, the heighth of which, when the valve is closed, is substantially the same as the diameter of the bore 17 of the pipe line 4 to the burner.

Above the reduced portion 15, the valve stem is enlarged and threaded, as indicated at 18, to engage an internal thread 19 of the valve casing. The valve stem above the threaded portion 18 is again reduced and passes through the smooth bore of a stop nut or collar 20 which is threaded at 21, to engage the internal thread 19 of the valve casing and is flanged at 22 to seat on an annular shoulder 23 within the casing. When the stop nut or collar is screwed home and the valve is closed, as shown in Fig. 3, the space 24, separating the bottom of the collar and top of the enlarged threaded portion of the valve stem, represents the extent of movement allowed the valve from full closed to full open position.

Above the stop collar 20, and encircling the valve stem, there is the usual packing 25, pressure ring 26 and screw cap 27. The valve stem passing through a central opening of the screw cap, is provided with the usual handle 28, for turning the stem to open and close the valve.

Communication is provided through the valved opening between the pipe 9 and a short pipe section 29, forming part of the supply line from the valve to the burner, by forming the bore of the pipe section 29 in tangential relation to the annular space 16 at the bottom of the valve casing around the valve stem, as shown in Figs. 3 and 4.

The short pipe section 29, at right angles to the pipe 9, is cast in part with the valve casing and extends at both ends beyond the same, one end being detachably connected to the supply line to the burner, as indicated at 30, and the other end being open and threaded to receive a screw cap 31.

As will be evident from the drawing, when the screw cap 31 is removed, a clear and unobstructed passage is presented for the entrance of a cleaning wire or brush through the supply line from the valve to the burner and this cleaning tool may be moved freely back and forth throughout the entire length of the line without disturbing the connection 30, thus enabling any householder or layman, as previously pointed out, to clear the lines expeditiously and without the aid of a skilled workman.

As the operation and many advantages of the invention will be apparent from the foregoing, it will not be necessary to further describe the same.

Having described my invention, I claim:

1. In a fuel supply system for a burner, a control valve having its casing arranged with the inlet thereof opening into the fuel supply pipe at a point removed from the end of the pipe and the outlet thereof opening into a tubular extension angularly disposed to the valve casing and terminating in open ends threaded to receive a removable closure at one end and the coupling of a fuel delivery pipe at the other end, the assembly being such as to provide unobstructed passage for a cleaning wire through the delivery pipe clear of the valve.

2. In a fuel supply system for a burner, a fuel supply pipe terminating in an open end provided with a removable closure, and a control valve having its casing arranged with the inlet thereof opening into the supply pipe adjacent the open end of the pipe and the outlet thereof opening into a tubular extension angularly disposed to the valve casing and having open ends threaded to receive a removable closure at one end and a coupling of a fuel delivery pipe at the other end, the assembly being such as to provide unobstructed passage for a cleaning wire either through the supply pipe or through the delivery pipe, clear of the valve.

3. In a fuel supply system for a burner, a fuel supply pipe terminating in an open end provided with a removable closure, and a control valve having its casing arranged with the inlet thereof below the valve, opening into the supply pipe adjacent the open end of the pipe and the outlet thereof above the valve, opening into a tubular extension of the casing at a point intermediate the ends of the extension, the said extension being angularly disposed to the casing and having its ends open and threaded to receive a removable closure at one end and a coupling of a fuel delivery pipe at the other end, the assembly being such as to provide unobstructed passage for a cleaning wire either through the supply pipe or through the delivery pipe, clear of the valve.

4. In a fuel supply system for a burner, a fuel supply pipe terminating in an open end provided with a removable closure, and a control valve having its casing arranged with the inlet thereof below the valve, opening into the supply pipe adjacent the open end of the pipe and the outlet thereof above the valve, opening into a tubular off-set extension of the valve casing at a point intermediate the ends of the extension, the said extension being located above the supply pipe at substantially right angles to both the casing and the supply pipe and having open threaded ends to receive a removable closure at one end and a coupling of a fuel delivery pipe at the other end, the assembly being such as to provide unobstructed passage for a cleaning wire either through the supply pipe or through the delivery pipe, clear of the valve.

GEORGE RICHTER.